(12) United States Patent
Yang et al.

(10) Patent No.: US 6,267,404 B1
(45) Date of Patent: Jul. 31, 2001

(54) DETACHABLE ARM STRUCTURE FOR A BABY STROLLER

(75) Inventors: Cheng-Fan Yang, Tainan Hsien; Ya-Wen Hsiu, Kaohsiung, both of (TW)

(73) Assignee: Link Treasure Limited (VG)

( * ) Notice: Subject to any disclaimer, the term of this patent is extended or adjusted under 35 U.S.C. 154(b) by 0 days.

(21) Appl. No.: 09/417,951

(22) Filed: Oct. 13, 1999

(51) Int. Cl.$^7$ ...................................................... B62B 9/24
(52) U.S. Cl. .......................... 280/642; 280/47.38; 403/305
(58) Field of Search .................................... 280/642, 647, 280/650, 655.1, 657, 658, 87.051, 47.36, 47.371, 47.38, 748; 403/109.3, DIG. 4, 305

(56) References Cited

U.S. PATENT DOCUMENTS

| | | | |
|---|---|---|---|
| 4,386,790 | * | 6/1983 | Kassai .................................. 280/650 |
| 4,506,907 | * | 3/1985 | Miyagi ................................ 280/642 |
| 4,515,389 | * | 5/1985 | Kassai .................................. 280/642 |
| 4,565,388 | * | 1/1986 | Kassai .................................. 280/650 |
| 4,989,891 | * | 2/1991 | Huang ................................ 280/47.38 |
| 5,044,650 | * | 9/1991 | Eberle, Jr. .......................... 280/655.1 |
| 5,168,601 | * | 12/1992 | Liu .................................. 280/47.371 |
| 5,535,483 | * | 7/1996 | Jane Cabagnero .............. 280/47.371 |
| 5,549,311 | * | 8/1996 | Huang ................................ 280/47.36 |
| 5,669,625 | * | 9/1997 | Jane Cabagnero ................ 280/47.38 |
| 5,820,144 | * | 10/1998 | Wang ................................ 280/47.38 |
| 5,915,712 | * | 7/1999 | Stephenson et al. ................. 403/305 |

* cited by examiner

Primary Examiner—J. J. Swann
Assistant Examiner—Christopher Bottorff
(74) Attorney, Agent, or Firm—W. Wayne Liauh (57) ABSTRACT

A detachable arm for a baby stroller comprises a left and a right sub-arms releasably attached to a left and a right sub-frames respectively by a respective engaging member, and an attaching member for releasably attaching left and right sub-arms together wherein left and right sub-arms are attached to form a complete arm in an operating position, and left and right sub-arms are separated each other and rotate downwardly a predetermined angle with respect to sub-frames when the attaching member is separated from one of the sub-arms, or alternatively left and right sub-arms are separated from sub-frames when the engaging member are separated from sub-frames in a non-operating position.

9 Claims, 11 Drawing Sheets

DETACHABLE ARM STRUCTURE FOR A BABY STROLLER

BACKGROUND OF THE INVENTION

1. Field of the Invention

The present invention relates to a stroller arm, and more particularly to a detachable arm for a baby stroller.

2. Related Art

A conventional baby stroller substantially comprises a frame, a seat, and four wheels. Further, a protective U-shaped arm is provided in sides and front of baby for preventing it from sliding out of the seat. In other words, the only way to take baby out of stroller is by the help of an adult from top of arm.

A number of designs of detachable arms aimed at facilitating infant to leave stroller have been located in a search as follows:

U.S. Pat. Nos. 4,989,891 and 5,549,311 disclose a removable safety bar for a baby stroller as well as armrest and handle assembly for a stroller respectively. The arm and armrest disclosed in both patents are detachable from strollers.

Another conventional arm is provided with one end pivotably secured to one side of stroller and the other end detachable secured to the opposing side of stroller such that one end of the arm may be separated from stroller when needed.

SUMMARY OF THE INVENTION

It is an object of the present invention to provide a detachable arm for a baby stroller wherein arm may be further separated from center thereof.

The advantages of the present invention are realized by providing a detachable arm comprising a left and a right sub-arms releasably attached to a left and a right sub-frames respectively by a respective engaging means, and an attaching means for releasably attaching left and right sub-arms together wherein left and right sub-arms are attached to form a complete arm in an operating position, and left and right sub-arms are separated each other and substantially rotate downwardly a predetermined angle with respect to sub-frames when attaching means is separated from one of the sub-arms, or alternatively left and right sub-arms are separated from sub-frames when engaging means are separated from sub-frames in a non-operating position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
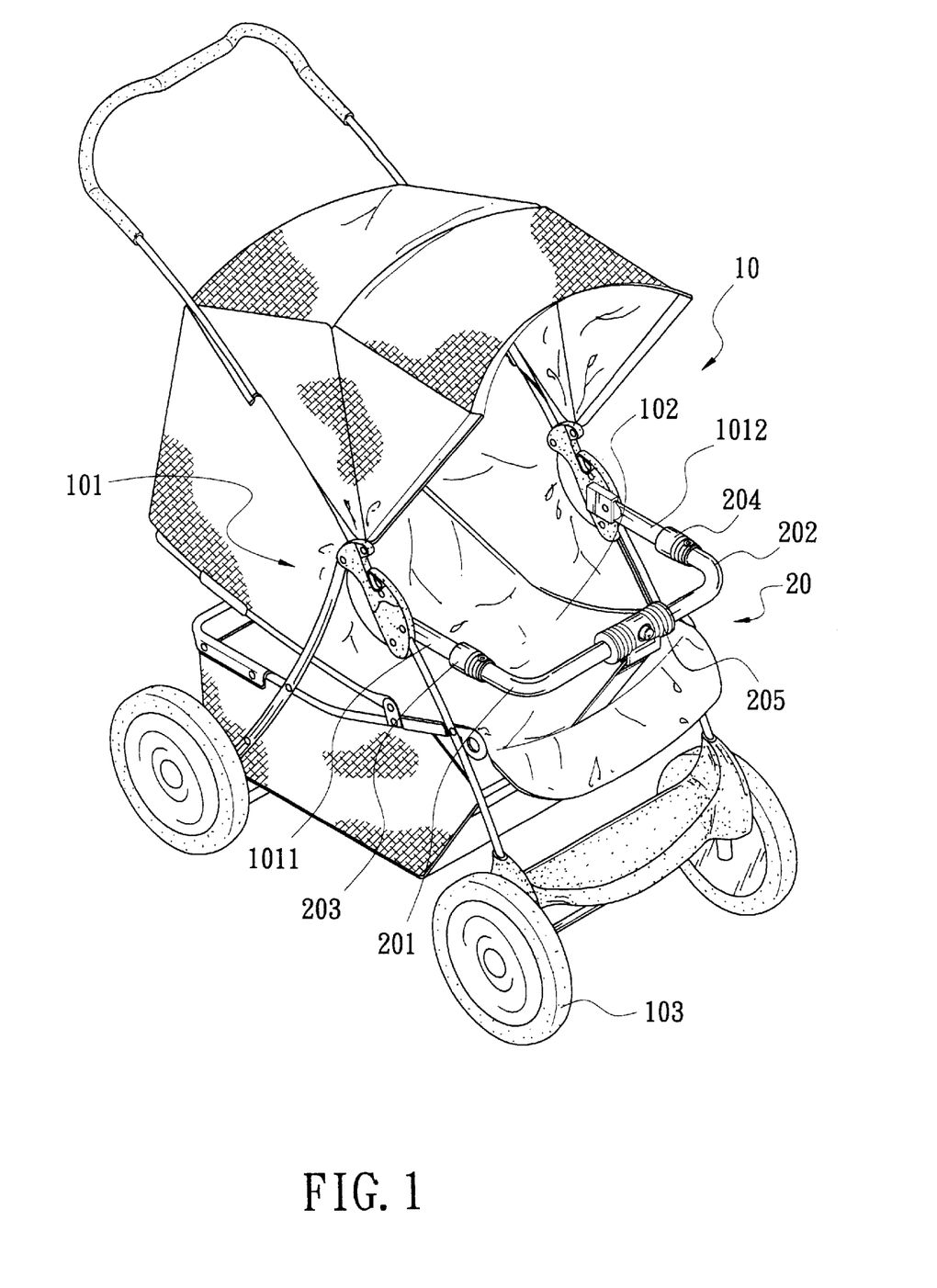
FIG. 1 is a perspective view illustrating a first embodiment of the present invention.

Referring to FIG. 1, there is shown a stroller 10 according to a first embodiment of the invention comprising a frame 101, a seat 102 for receiving the passenger in a sitting or lying position, and four wheels 103 for moving stroller 10 wherein frame 101 consists of a plurality of pipelike sub-frames. Two of sub-frames, e.g., sub-frames 1011, 1012, are arm sub-frames capable of releasably attaching to arm 20.

Figure 2:
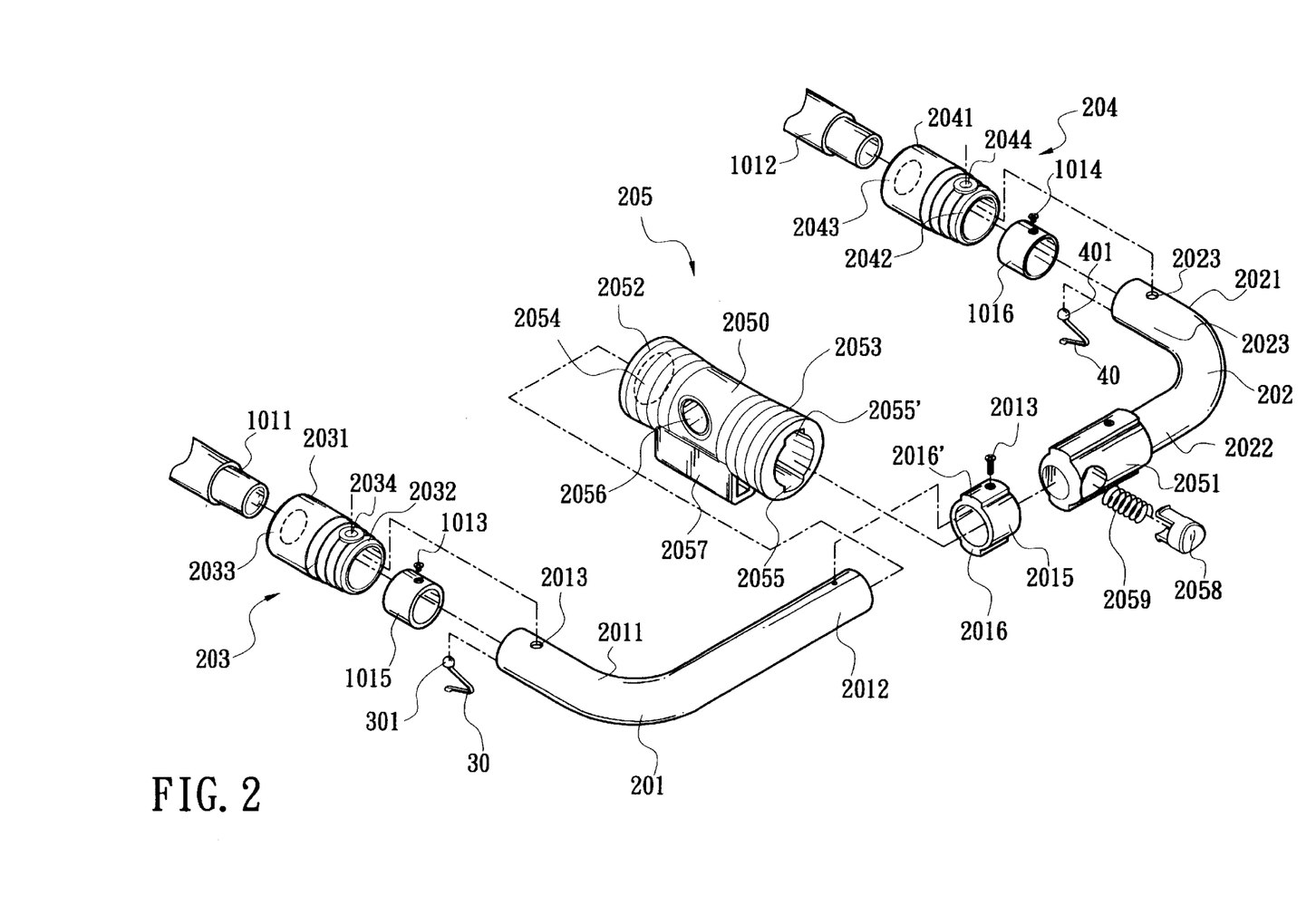
FIG. 2 is an exploded view of arm of FIG. 1, the arm is separated from the sub-frames.
Figure 3:
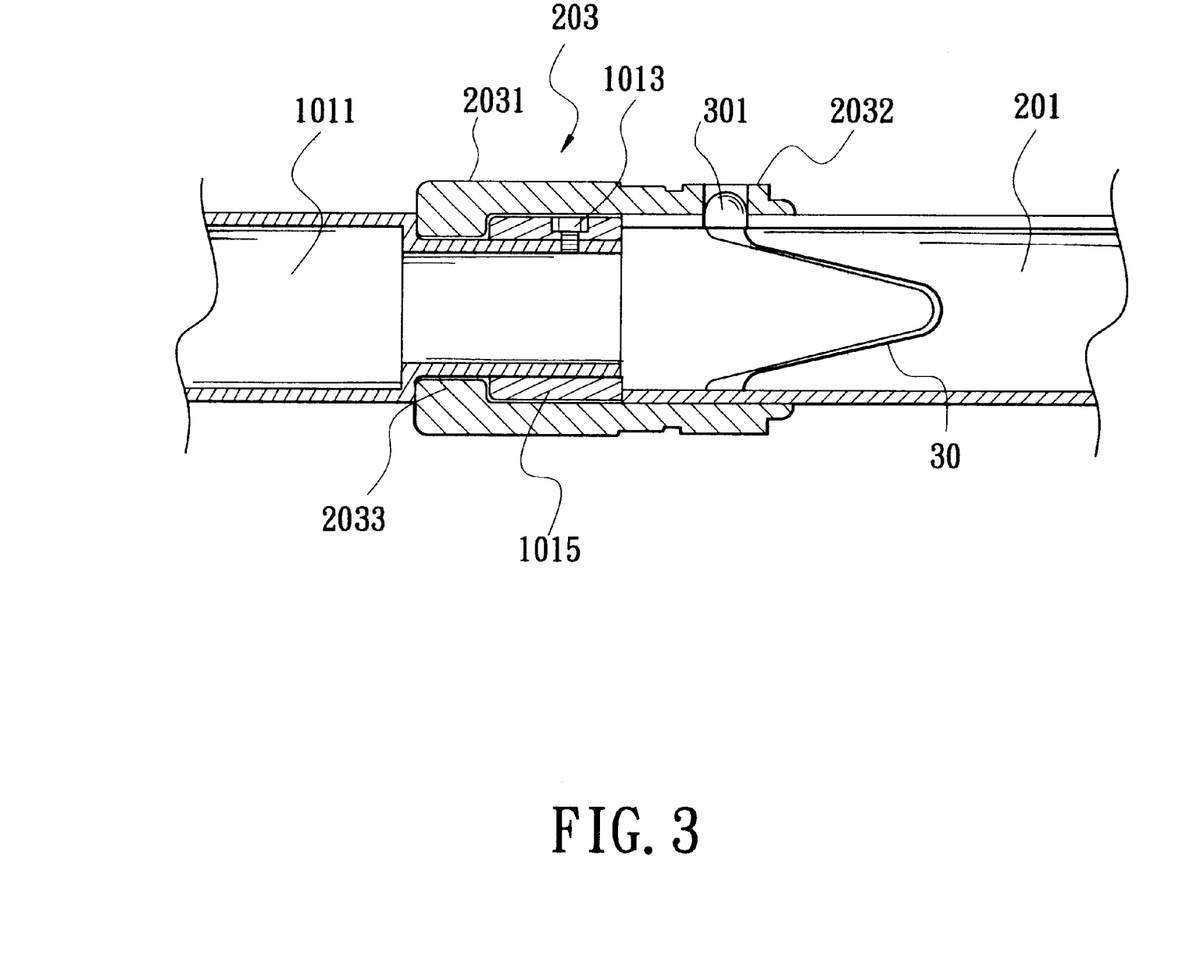
FIG. 3 is a sectional view illustrating the attachment of sub-arm and sub-frame.

Referring to FIGS. 2–3, arm 20 comprises left sub-arm 201, right left sub-arm 202, two engaging devices 203, 204, and an attaching device 205 wherein engaging devices 203, 204 are pipelike members with first ends 2031, 2041 capable of attaching to sub-frame 1011, 1012 respectively; and second ends 2032, 2042 capable of attaching to left sub-arm 201, 202 respectively.

Screws 1013, 1014 are employed to secure sleeves 1015, 1016 to front portions of sub-frames 1011, 1012 respectively. Each of sleeves 1015, 1016 has an inner diameter slightly larger than outer diameter of front portion of each of sub-frames 1011, 1012, while slightly smaller than inner diameter of each of engaging devices 203, 204. Shoulders 2033, 2043 are formed on first ends 2031, 2041 of engaging devices 203, 204 respectively. Each of shoulders 2033, 2043 has an inner diameter slightly larger than outer diameter of front portion of each of sub-frames 1011, 1012, while smaller than the rear portion thereof. Further, each of shoulders 2033, 2043 has inner diameter smaller than outer diameter of each of sleeves 1015, 1016. As such, shoulders 2033, 2043 are pivotably secured on indented portions formed between rear portions of sub-frames 1011, 1012 and sleeves 1015, 1016 respectively.

Left and right sub-arms 201, 202 substantially are identical L-shaped tubelike members opposing each other. Each of left sub-arm 201 and right sub-arm 202 has first portions 2011, 2021 and second portions 2012, 2022 respectively. Each of second portions 2012, 2021 has a length substantially half of the width of the stroller viewed from front side thereof. Holes 2013, 2023 are provided near the open ends of first portions 2011, 2021 respectively. Correspondingly, two holes 2034 and 2044 are provided on engaging devices 203, 204 respectively. Each of V-shaped resilient springs 30, 40 has two ends formed as half round pins 301 or 401. Mount resilient springs 30, 40 into sub-arms 201, 202 with pins 301, 401 protruded from holes 2013, 2023 respectively.

Then insert sub-arms 201, 202 into engaging devices 203, 204 until pins 301, 401 are received in holes 2034 and 2044 respectively. As a result, sub-arms 201, 202 are secured to engaging devices 203, 204 respectively.

Figure 4A:
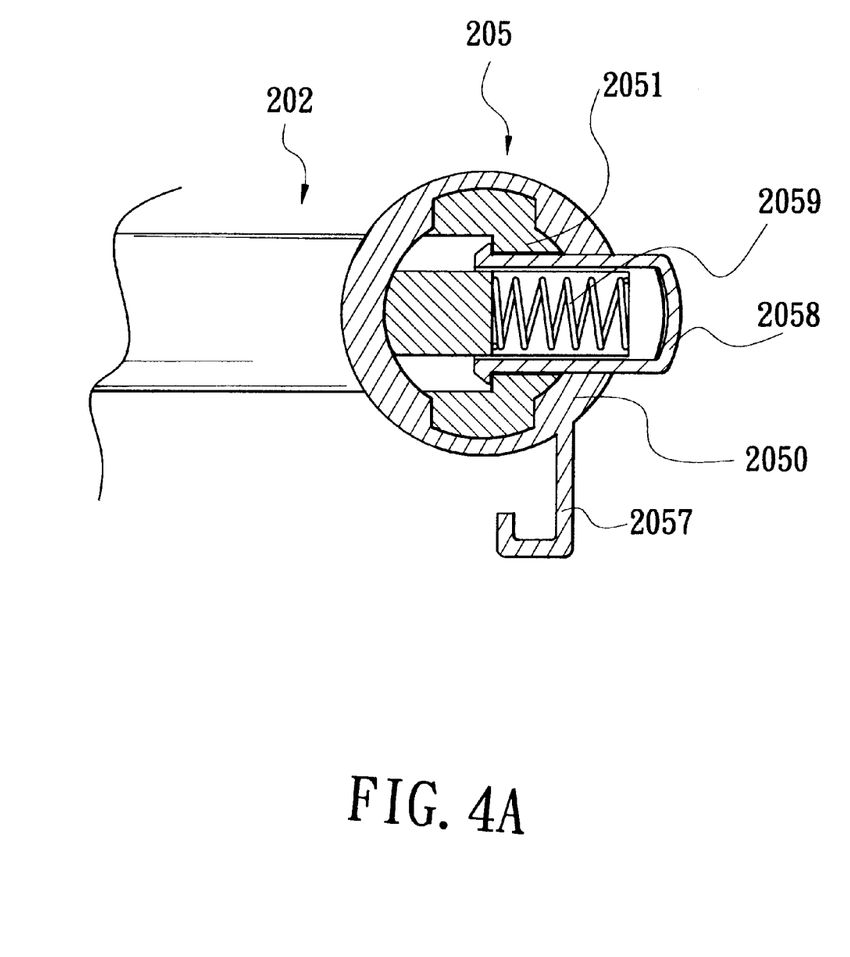
FIGS. 4A and 4B are sectional views respectively for illustrating the attachment of sub-arms together by attaching device.
Figure 4B:
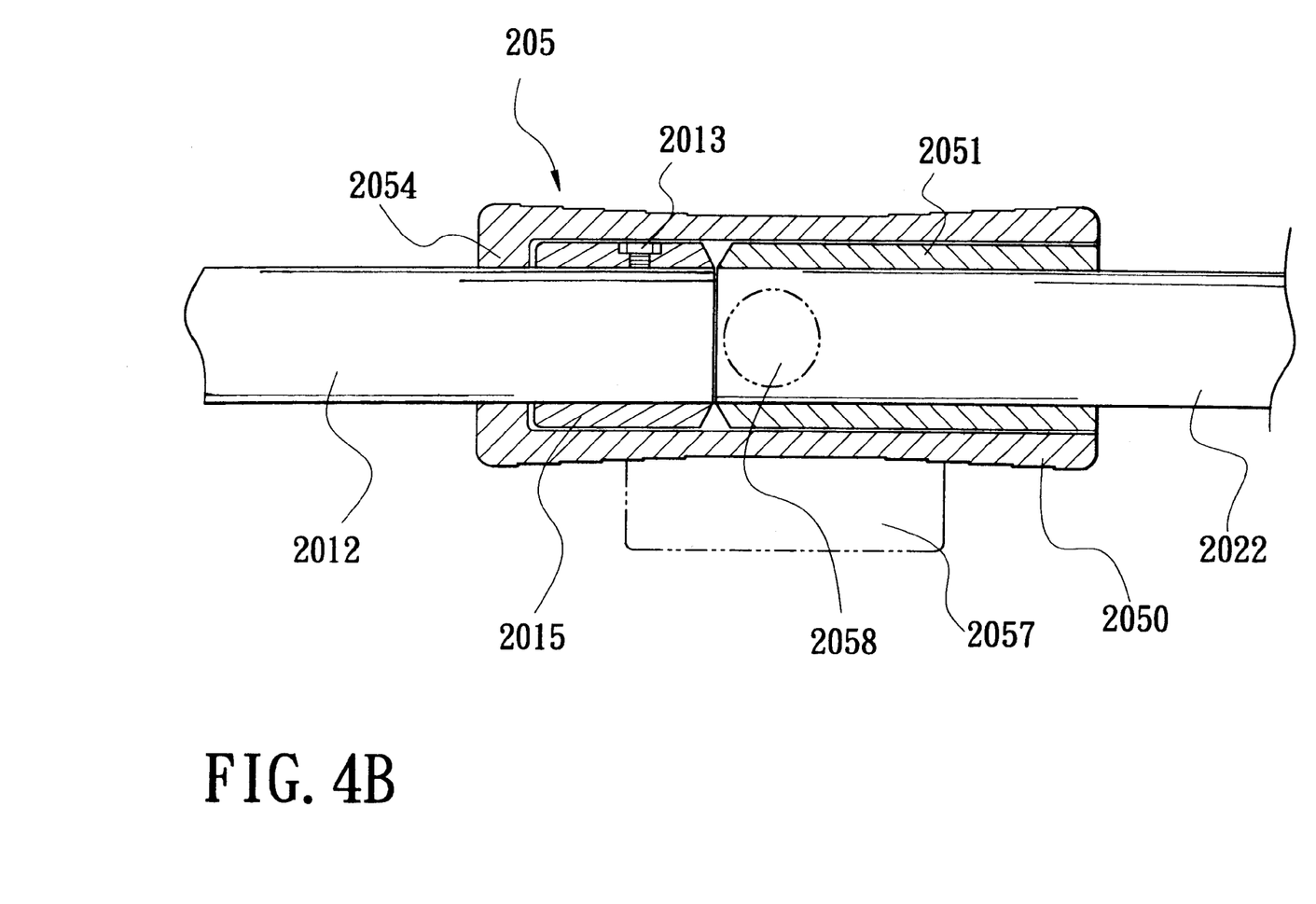

Referring to FIGS. 2 and 4A–4B, attaching device 205 comprises a tube member 2050 having a front center hole 2056, a first and second engaging portions 2052, 2053, a shaped tubelike engaging member 2051, a sleeve 2015, and a hook member 2057 for attaching to canopy. Sleeve 2015 is mounted over second portion 2012 of left sub-arm 201 and is held in place by a screw 2013 and has an inner diameter slightly larger than an outer diameter of second portion 2012, and an outer diameter slightly smaller than inner diameter of tube member 2050. A shoulder 2054 is formed on an end of first engaging portion 2052 and has an inner diameter smaller than outer diameter of sleeve 2015 for preventing tube member 2050, which already having sub-arms 201, 202 received therein, from being moved out of engagement with left sub-arm 201 when shoulder 2054 is engaged with sleeve 2015. A pair of opposing ribs 2016, 2016' are formed on the outer circumferential surface of sleeve 2015. Correspondingly, a pair of opposing guide grooves 2055, 2055' formed on the inner circumferential surface of tube member 2050 capable of receiving ribs 2016, 2016' therein. A helical spring 2059 is received between bottom of a hollow button member 2058 and a projection member and as such button member 2058 is protruded from a hole of engaging member 2051 by expansion of spring 2059 until caught by two opposing shoulders within engaging member 2051. Thus, engaging member 2051 is secured on right sub-arm 202.

Figure 5:
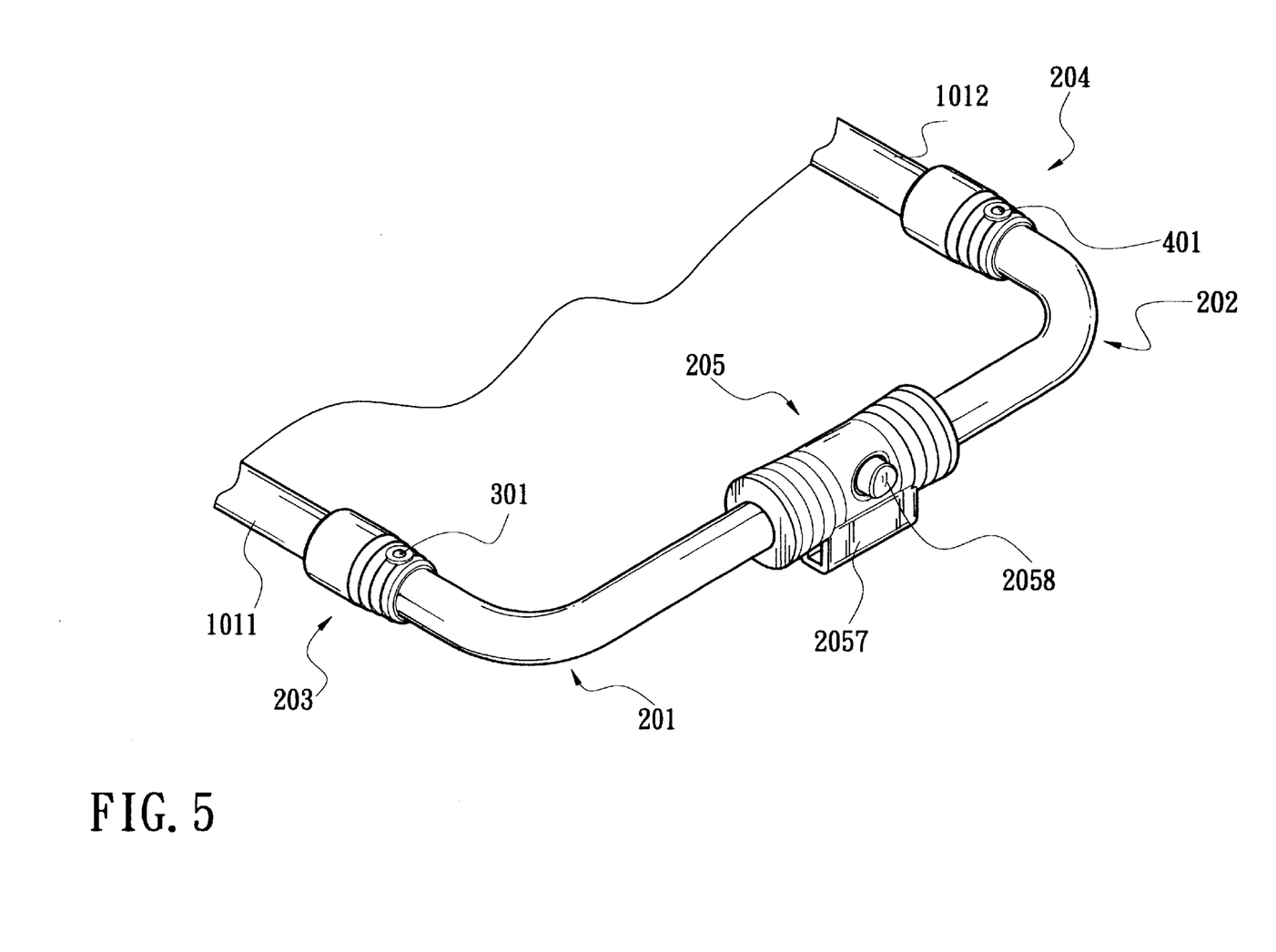
FIG. 5 is an enlarged perspective view illustrating the assembled arm of FIG. 1.

In assembly, insert engaging member 2051 into tube member 2050 first until the previously inward compressed button member 2058 protruded from center hole 2056 for securing engaging member 2051 and right sub-arm 202 to tube member 2050. Now engaging member 2051 and right sub-arm 202 both are in contact with left sub-arm 201. Thus an assembled arm is complete as shown in FIG. 5. It is understood that a seated baby (not shown) is well protected from sliding out of seat.

Figure 6:
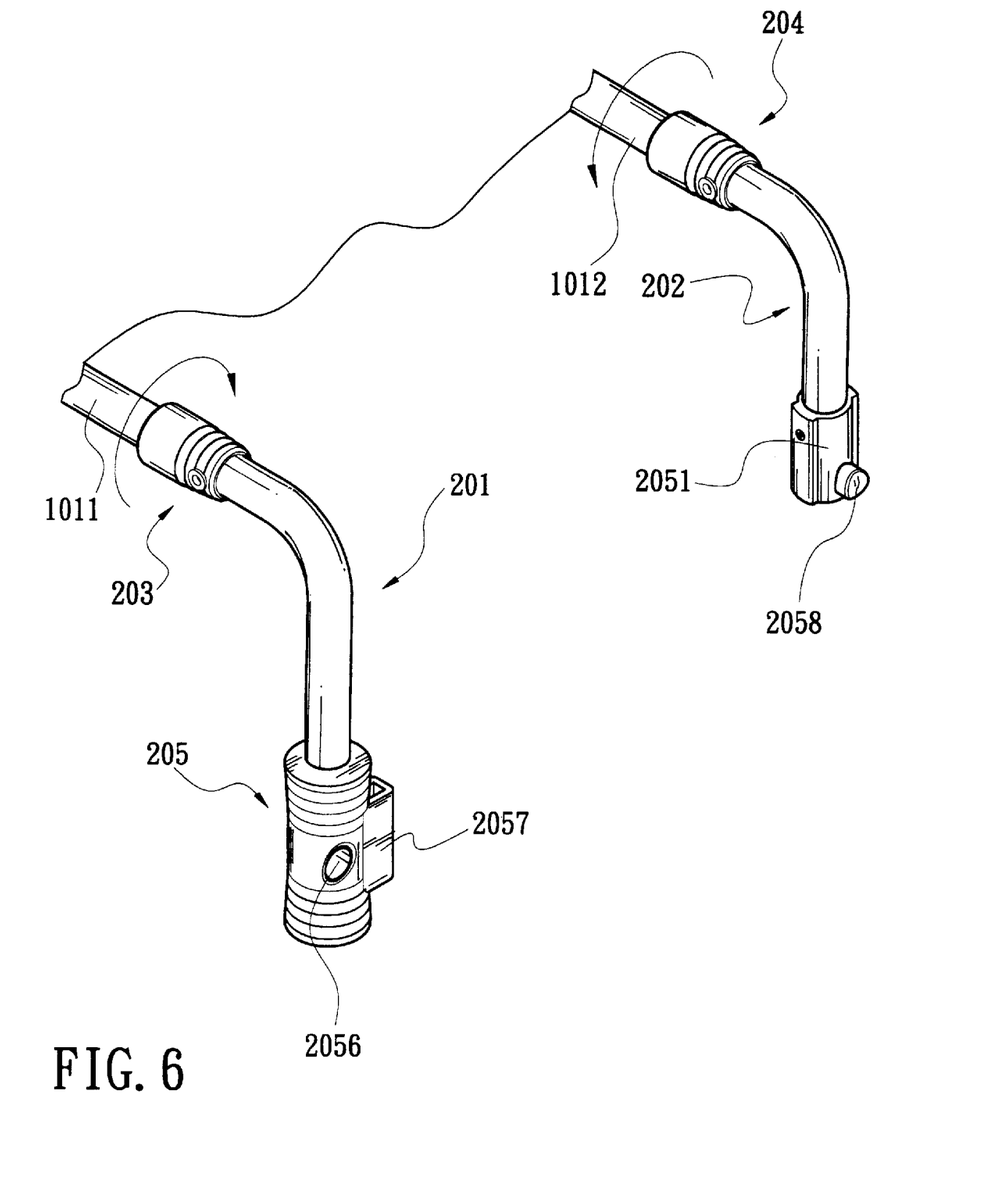
FIG. 6 is a perspective view illustrating a non-operating position when attaching device is separated from the right sub-arm.

For disengaging right sub-arm 202 from left sub-arm 201, first press button member 2058 down until it completely retracts into the inner space of tube member 2050. Then move second engaging portion 2053 toward left sub-arm 201 until second engaging portion 2053 completely pass engaging member 2051 and right sub-arm 202. Now, left and right sub-arms 201, 202 are separated each other and thus each of first and second portions 2011, 2021 substantially rotate downwardly about 90° with respect to sub-frames 1011, 1012 by their own weight in non-operating position as shown in FIG. 6. As a result, parent of guardian can conveniently take baby out of stroller from front side.

Figure 7:
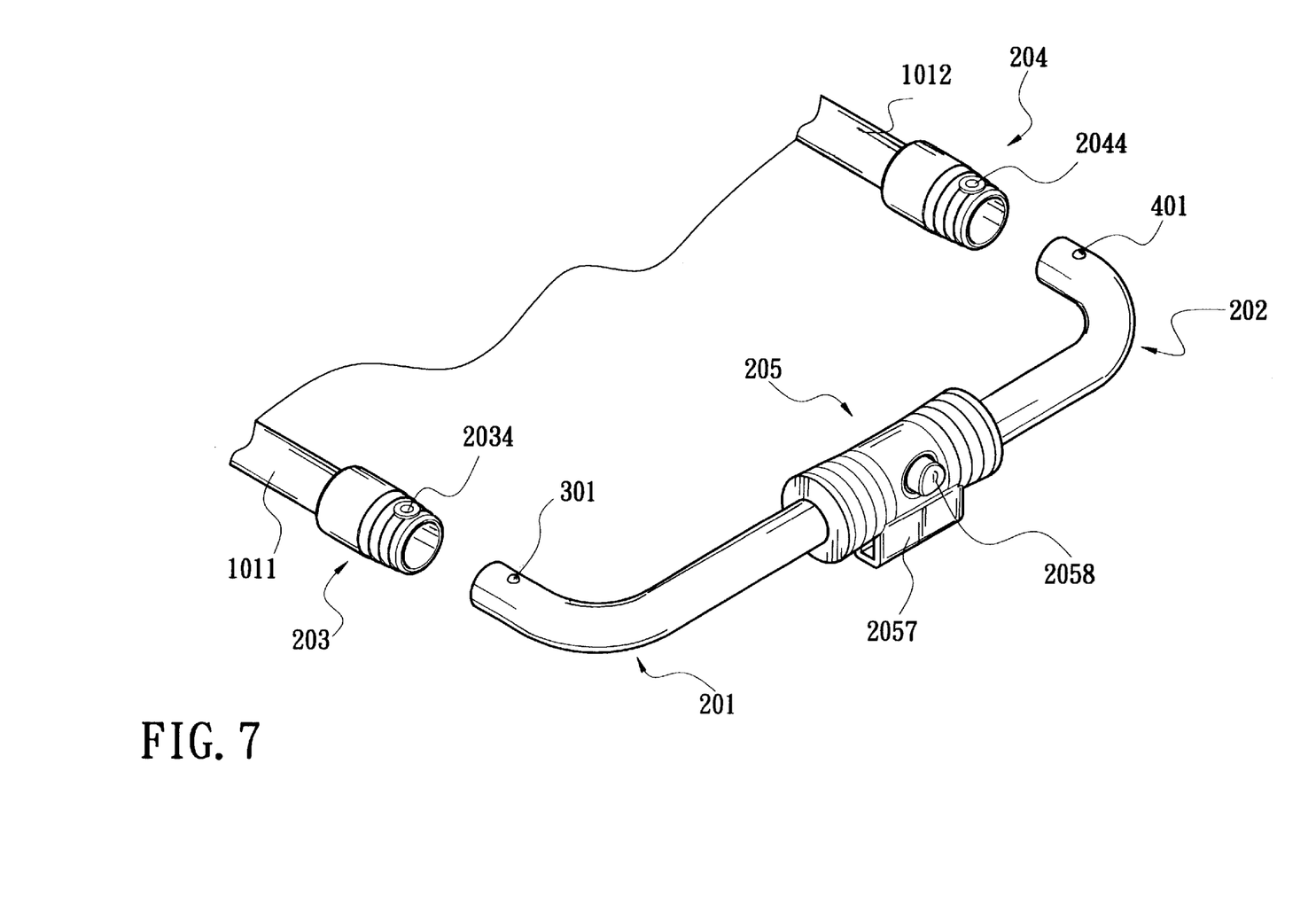
FIG. 7 is a perspective view illustrating a non-operating position when arm is separated from engaging devices.

Alternatively, push V-shaped resilient spring 30, 40 inwardly until pins 301, 401 completely leave hole 2034, and 2044 and retract into the inner spaces of first portions 2011, 2021 respectively. Then pull first portions 2011, 2021 from sub-frames 1011, 1012 to separate arm 20 from frame 101 in non-operating position as shown in FIG. 7.

Figure 8:
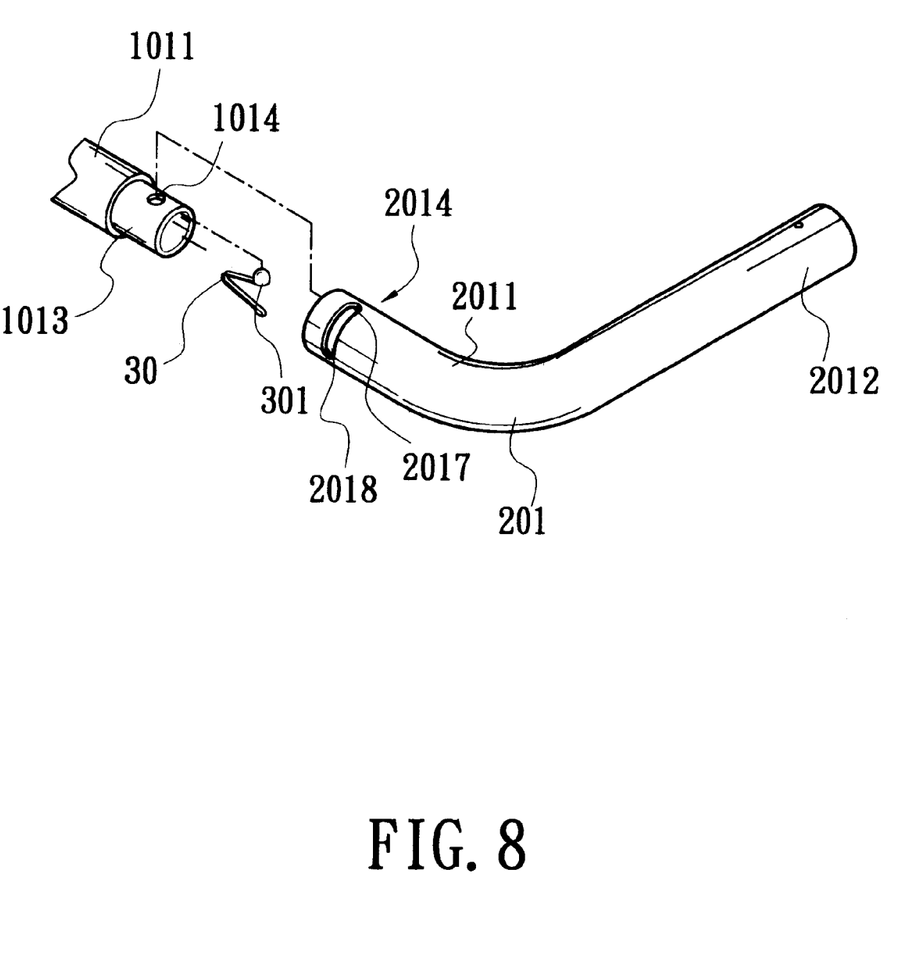
FIG. 8 is an exploded view of arm of a second embodiment of the present invention, the arm is separated from the sub-frames.
Figure 9A:
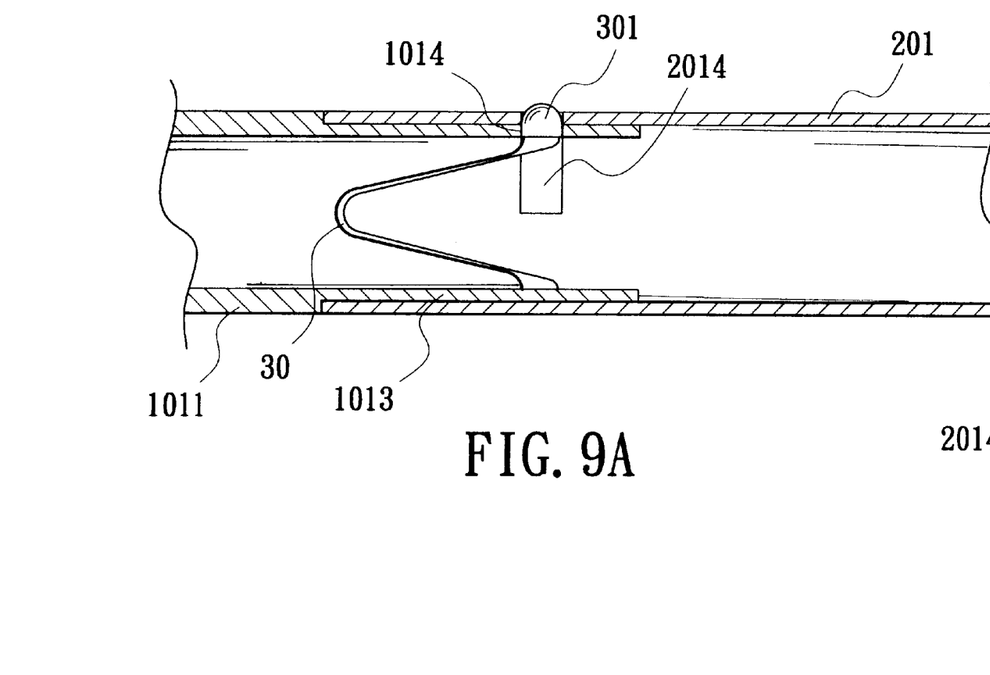
FIGS. 9A and 9B are sectional views respectively illustrating the attachment of sub-arm and sub-frame.
Figure 9B:
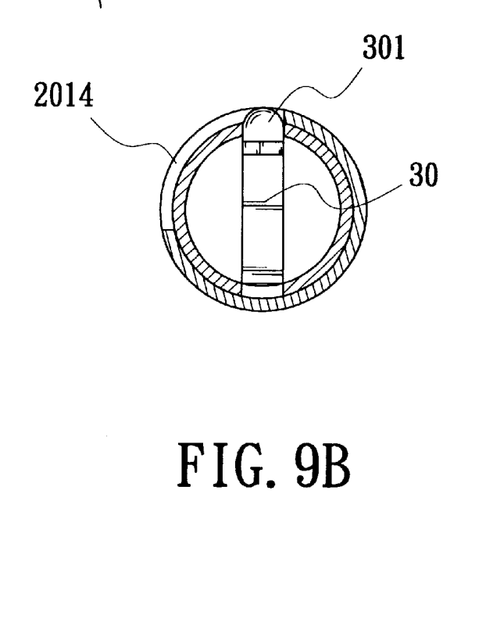

FIGS. 8, 9A and 9B illustrate an alternative embodiment of engaging devices 203, 204. Note that arm is bilaterally symmetrical so that description of one side serves to describe the entirety. Sub-frame 1011 substantially having a round hollow section has a front raised engaging portion with a hole provided on top. A V-shaped resilient spring 30 has two ends in which one end is formed as a half rounded pin 301. Mount resilient spring 30 into sub-frame 1011 with pin 301 protruded from the hole of the sub-frame 1011. Then insert front raised engaging portion into first portion 2011 of left sub-arm 201 until pin 301 is received in first end 1017 of an elongated arcuate groove 2014 on the surface of first portion 2011. As a result, left sub-arm 201 is secured to sub-frame 1011.

For disengaging right sub-arm 202 from left sub-arm 201, first separate tube member 2050 from right sub-arm 202. Now first portion 2011 rotates downwardly with respect to sub-frames 1011 by their own weight and accordingly pin 301 slides from first end 2017 of elongated arcuate groove 2014 until stopped in second end 2018 in non-operating position similar to that shown in FIG. 6. Obviously, it is possible to press pin 301 down until it completely retracts into the inner space of front portion 1013 in order to separate left sub-arm 201 from sub-frame 1011.

Figure 10:
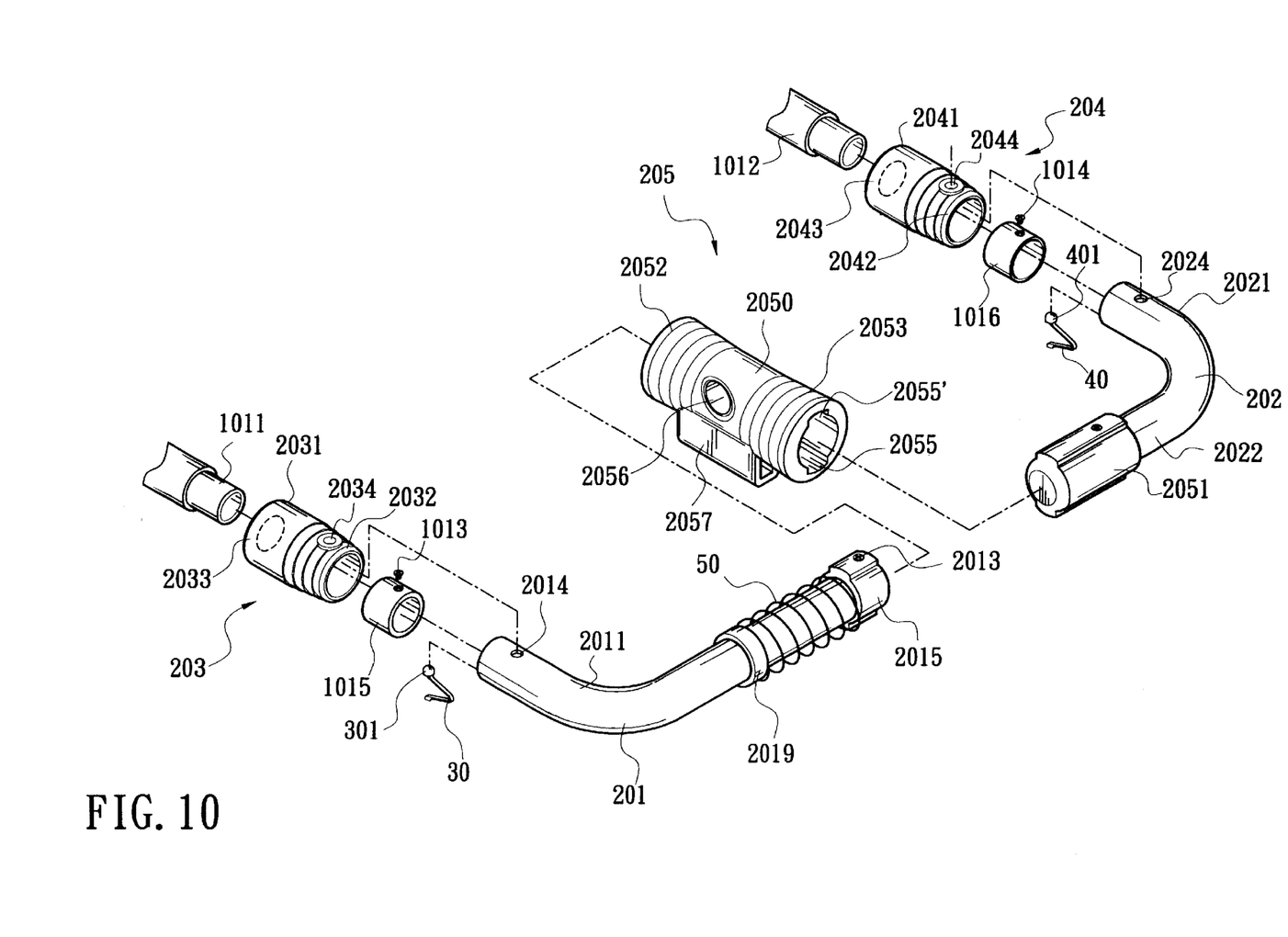
FIG. 10 is an exploded view illustrating arm of a third embodiment of the present invention.

FIG. 10 illustrates an alternative embodiment of attaching device 205 in which a spring 50 is put on second portion 2012 of left sub-arm 201 with one end of spring 50 stopped by a collar 2019 provided on second portion 2012 and the other end engaged with first engaging portion 2052, i.e., shoulder portion of first engaging portion 2052 is provided between spring 50 and threadedly secured sleeve 2014. Note that hollow button member 2058 and helical spring 2059 are eliminated by this embodiment.

In assembling, applies a force on tube member 2050 so as to bias spring 50 toward collar 2019 until second engaging portion 2053 is flush with the end of second portion 2012 of left sub-arm 201. Then align left sub-arm 201 with right sub-arm 202. Finally, release tube member 2050 to receive right sub-arm 202 therein. Now left sub-arm 201 and right sub-arm 202 are secured together by attaching device 205.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arm structure for a baby stroller having a frame including a plurality of pipe sub-frames, a seat for receiving a passenger in sitting or lying position, and at least four wheels for moving the stroller, comprising:

a left sub-arm and a right sub-arm each having a first portion and a second portion extended toward each other in an operating position;

a left engaging means and a right engaging means for pivotably attaching the first portions to the left sub-frame and the right sub-frame, respectively; and an attaching means for releasably securing the left and the right sub-arms in the operating position, wherein the left and the right sub-arms are separated from each other when the attaching means is separated from one of the sub-arms in a non-operating position such that each of the sub-arms pivotably rotates downwardly a predetermined angle with respect to the corresponding sub-frame by its own weight;

further wherein the attaching means comprises a tube member having a front center hole, a first engaging portion engaging with the second portion of the left sub-arm and a second engaging portion; a shaped tube-like engaging member provided on the second portion of the right sub-arm having a hollow button member capable of penetrating the front center hole; and a spring member received between a bottom of the hollow button member and the right sub-arm so as to permit the hollow button member to protrude from the front center hole of the tube member by expansion of the spring member in the operating position.

2. The arm structure of claim 1, wherein the corresponding sub-frames are left arm and right arm sub-frame, respectively.

3. The arm structure of claim 2, wherein each of the left and the right engaging means is a pipe member including a first end adapted to be rotatably attached to the left and the right arm sub-frames, respectively, and a second end having a hole.

4. The arm structure of claim 2, which further comprises a sleeve provided in front of each of the left and right are sub-frames for preventing the left and the right engaging means from being moved out of engagement with the left and right sub-frames, respectively.

5. The arm structure of claim 3, wherein each of the left and the right sub-arms is of substantially L-shaped, a pair of V-shaped resilient springs each has at least one end pin capable of protruding from the first portions, and the left and the right sub-arms are inserted into the second ends of the left and right engaging means respectively for securing the sub-arms to the engaging means by the end pin received in the holes of the engaging means.

6. The arm structure of claim 5, wherein each of the left and right arm sub-frames has a front raised engaging portion with a hole provided on a top thereof, the end pin of the V-shaped resilient spring is protruded from the hole of each of the left and right arm sub-frames, and each of the sub-arms has an elongated arcuate groove including a first end and a second end on the first polyfon such that each of the end pin is received in the first end of the elongated arcuate groove in the operating position.

7. The arm structure of claim 1, which further comprises a sleeve mounted over the second portion of the left sub-arm for preventing the tube member from being moved out of an engagement with the left sub-arm.

8. The arm structure of claim 1, wherein the tube member comprises a canopy hook member.

9. The arm structure of claim 1, wherein the tube-like engaging member comprises a resilient spring.

* * * * *